Aug. 22, 1950  I. DREYER  2,519,444
VAPORIZER
Filed May 4, 1946
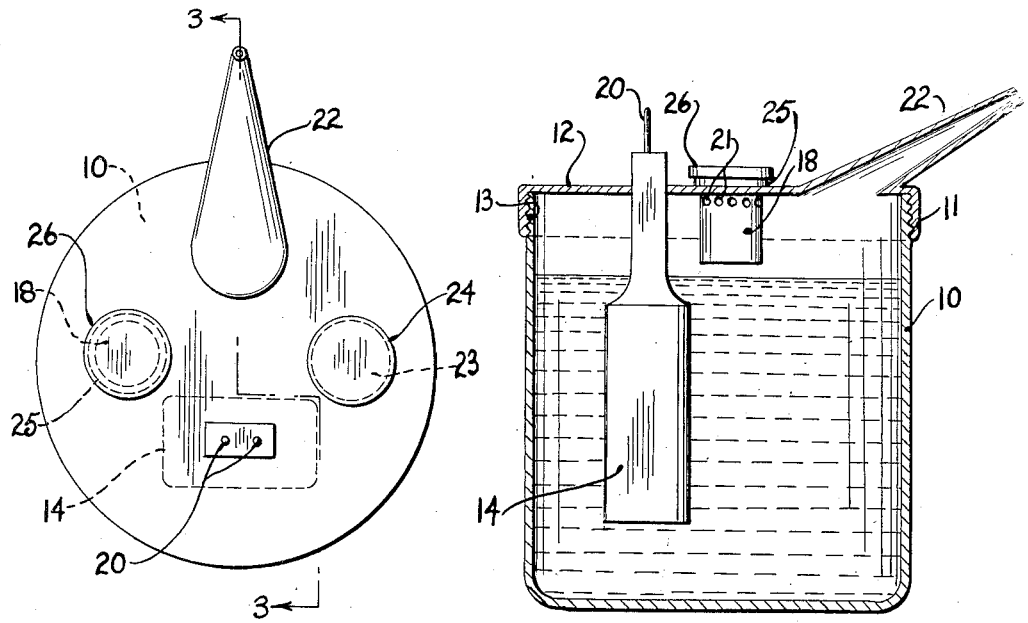
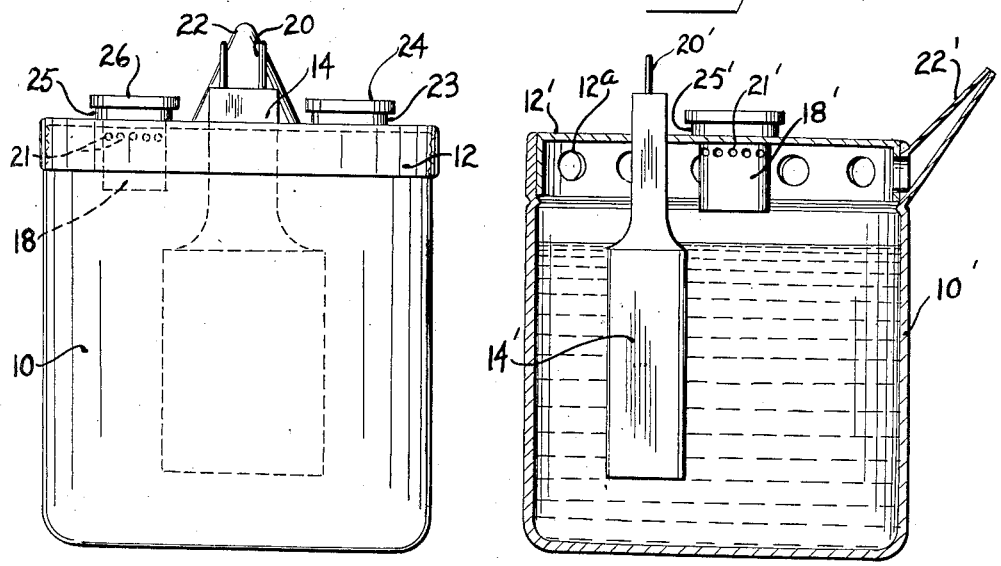
INVENTOR.
ISAAC DREYER
BY
ATTORNEY Patented Aug. 22, 1950

2,519,444

UNITED STATES PATENT OFFICE 2,519,444

VAPORIZER

Isaac Dreyer, Brooklyn, N. Y.

Application May 4, 1946, Serial No. 667,235

2 Claims. (Cl. 219—38)

This invention relates to new and useful improvements in a vaporizer.

More specifically, the present invention proposes the construction of a vaporizer characterized by having a container for water, a heating unit, a receptacle for a medicine, a cover for the container to which the unit and receptacle are secured, a vapor spout in the cover, and two funnels in said cover opening one to the container and one to the receptacle, each of the funnels having a removable cap.

Another object is to provide a vaporizer as aforesaid in which the heating unit is secured to the cover.

Still another object is to provide a vaporizer as aforesaid in which the receptacle is provided with a row of ports adjacent the cover.

A further object is to provide a vaporizer as aforesaid in which the receptacle is removably connected so that it can be separated for cleaning.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a side view of a vaporizer constructed in accordance with this invention.

Fig. 2 is a plan view of the vaporizer.

Fig. 3 is an enlarged sectional view on the line 3—3 of Fig. 2.

Fig. 4 is a sectional view similar to Fig. 3 of a vaporizer constructed in accordance with a modification of this invention.

The vaporizer, according to this invention, comprises a glass container 10 having external threads 11 at its top. A cover 12, having internal threads 13, is screwed on the container. A heating unit 14 and a receptacle 18 are secured to the cover as illustrated. An electrical heating coil (not shown) is enclosed in the unit and is connected to two electrodes 20 which pass upwardly through the container and through the cover so that they extend above the cover for coaction with the plug (not shown) of a conventional electric cord. The cover is preferably made of metal and the electrodes are insulated where they pass through the cover.

The container is for water which is to be converted into steam and the receptacle 18 is for chemicals or medicine such as tincture of benzoin. The receptacle 18 has a row of orifices 21 near the cover so that the steam can pass into the receptacle, mix with the medicine and pass out of the receptacle into the container from which it leaves the vaporizer through the nozzle 22 which is a piece of tubing secured in the cover over the container.

The container is filled with water through a funnel 23 secured in an orifice in the cover and closed by a threaded cap 24. The receptacle 18 is filled with medicine through a funnel 25 secured in an orifice in the cover over the receptacle and closed by a threaded cap 26.

The operation of the vaporizer is as follows:

The water and medicine are added to the container and receptacle respectively through the funnels 23 and 25 respectively. An electric cord is plugged on the electrodes 20 and the heat generated in the unit 14 heats the water, changing it into steam, the steam entering the receptacle through the ports 21 and leaving the receptacle in a medicated state through the ports 21 whereupon it leaves the vaporizer through the nozzle 22.

It is an important feature of the present invention that as the water decreases it may be replaced through the funnel 23 and as the medicine decreases it may be replaced through the funnel 25, a continuous vaporization being maintained at all times.

In the form of the invention (shown in Fig. 4) nozzle 22' is shown as an integral part of container 10'. Orifices 12ᵃ located along the periphery of the cover 12' are aligned with nozzles 22' to permit the escape of the medicated steam through nozzle 22'. This construction would be particularly adaptable for use in a container constructed of metal. All other parts are similar to those already described and like numbers refer to like parts.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a vaporizing unit having a cover closing the open top of the container to be partially filled with a fluid which is to be converted into steam by a heater extended into the container from the cover and a receptacle for a medicament suspended in the container from the cover, means for facilitating replenishing the supply of fluid in the container and the supply of medicament in the receptacle without removing the cover, comprising a funnel mounted through the cover removed from the receptacle through which fluid can be poured to replenish the supply thereof in the container, a funnel mounted through the cover concentric with the receptacle through which the medicament can be poured to replenish the supply thereof in the receptacle, and means independently closing the outer ends of said funnels.

2. In a vaporizing unit having a cover closing the open top of a container to be partially filled with a fluid which is to be converted into steam by a heater extended into the container from the cover and a receptacle for a medicament suspended in the container from the cover, means for facilitating replenishing the supply of fluid in the container and the supply of medicament in the receptacle without removing the cover, comprising a funnel mounted through the cover removed from the receptacle through which fluid can be poured to replenish the supply thereof in the container, a funnel mounted through the cover concentric with the receptacle through which the medicament can be poured to replenish the supply thereof in the receptacle, and means independently closing the outer ends of said funnels, said funnels having their outer ends extended above the top face of the cover and formed with external threads, and caps threaded onto the outer ends of said funnels forming the means closing the same.

ISAAC DREYER.

REFERENCES CITED

The following references are of record in the file of this patent:

UNITED STATES PATENTS

| Number | Name | Date |
|---|---|---|
| 1,659,970 | Chouinard | Feb. 21, 1928 |
| 1,949,778 | Brown et al. | Mar. 6, 1934 |
| 1,981,765 | Weiss | Nov. 20, 1934 |
| 2,235,879 | Hanks | Mar. 25, 1941 |
| 2,379,034 | Pargman | June 26, 1945 |
| 2,387,155 | Katzman | Oct. 16, 1945 |